Feb. 9, 1926.                                                        1,572,680
J. L. PRICE
BRAKE BACKING PLATE
Filed August 17, 1925

INVENTOR
JACOB L. PRICE
BY M. W. McConkey
ATTORNEY

Patented Feb. 9, 1926.

1,572,680

UNITED STATES PATENT OFFICE.

JACOB L. PRICE, OF CHICAGO, ILLINOIS, ASSIGNOR TO BENDIX BRAKE COMPANY, OF CHICAGO, ILLINOIS, A CORPORATION OF ILLINOIS.

BRAKE-BACKING PLATE.

Application filed August 17, 1925. Serial No. 50,697.

*To all whom it may concern:*

Be it known that I, JACOB L. PRICE, a citizen of the United States, residing in Chicago, in the county of Cook and State of Illinois, have invented a certain new and useful Improvement in Brake-Backing Plates, of which the following is a specification.

This invention relates to brakes, and is illustrated as embodied in a backing plate for an automobile brake. An object of the invention is to obviate "drumming" of the backing plate, by providing plugs of different material arranged to prevent the building up of oscillations in the plate. Preferably the material is cast or otherwise secured in openings punched in the backing plate between the brake anchor and the brake-applying means,—i. e. at the points of greatest vibration in "drumming".

The advantages of this arrangement will be apparent from the following description of the illustrative embodiment of the invention shown in the accompanying drawing, in which.

Figure 1:
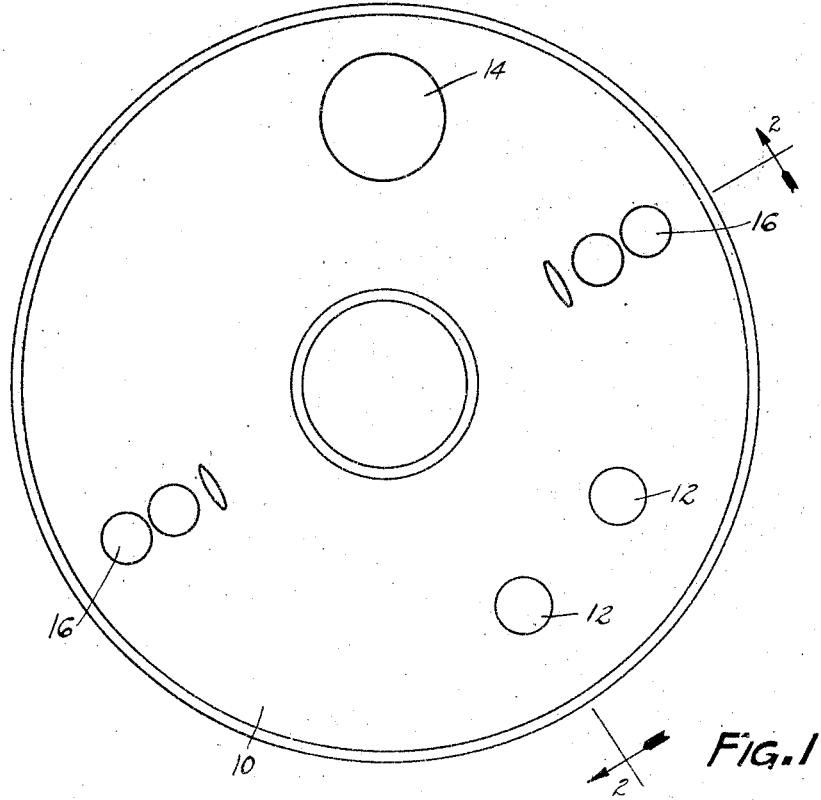
Fig. 1 is a front elevation of the brake backing plate.
Figure 2:
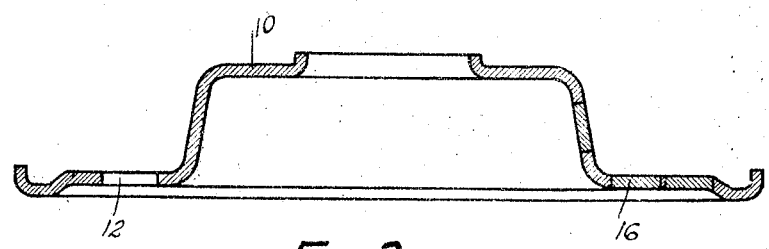
Fig. 2 is a section on the line 2—2 of Fig. 1.

While the principle is useful with other types of brakes, the particular backing plate shown is intended for use with a two-anchor three-shoe brake such as is illustrated in application No. 24,426, filed April 20, 1925. The plate 10 may be of any desired form, according to the brake with which it is to be used. It is provided with a pair of openings 12 for the brake anchors, and an opening 14 for the brake-applying means, which are clamped to the plate and therefore hold it against vibration at those points.

Between points 12 and 14 are arranged openings filled with plugs 16 of material different from the metal of the plate,—that is, material having different physical characteristics, such as lead, or a paper pulp composition, or other material which will not vibrate in consonance with the plate, and which will therefore damp out the vibrations without permitting them to build up to a disagreeable drumming.

While one illustrative embodiment has been described, it is not my intention to limit the scope of the invention to that particular embodiment, or otherwise than by the terms of the appended claims.

I claim:

1. A backing plate for a brake arranged to be engaged at spaced points by anchoring means and brake-applying means, and having openings at a point between the anchoring means and brake-applying means which are plugged with material having different physical characteristics, to prevent drumming.

2. A backing plate for a brake arranged to be engaged by anchoring means, and having openings at a point spaced from the anchoring means and which are plugged with material having different physical characteristics, to prevent drumming.

3. A backing plate for a brake having openings at spaced points for the passage of anchoring means and brake-applying means, and having openings at a point between the anchoring means and brake-applying means which are plugged with material having different physical characteristics, to prevent drumming.

In testimony whereof, I have hereunto signed my name.

JACOB L. PRICE.